United States Patent
Delos Ayllon et al.

(10) Patent No.: US 9,743,469 B2
(45) Date of Patent: Aug. 22, 2017

(54) COMPACT DRIVER FOR A LIGHT EMITTING DIODE HAVING AN INTEGRATED DUAL OUTPUT

(71) Applicant: PHILIPS LIGHTING HOLDING B.V., Eindhoven (NL)

(72) Inventors: Julia Delos Ayllon, Eindhoven (NL); Toni Lopez, Eindhoven (NL); Machiel Antonius Martinus Hendrix, Eindhoven (NL); Eduardo-Jose Alarcon-Cot, Eindhoven (NL)

(73) Assignee: PHILIPS LIGHING HOLDING B.V., Eindhoven (NL)

( * ) Notice: Subject to any disclaimer, the term of this patent is extended or adjusted under 35 U.S.C. 154(b) by 0 days.

(21) Appl. No.: 15/023,200

(22) PCT Filed: Sep. 19, 2014

(86) PCT No.: PCT/IB2014/064651
§ 371 (c)(1),
(2) Date: Mar. 18, 2016

(87) PCT Pub. No.: WO2015/040575
PCT Pub. Date: Mar. 26, 2015

(65) Prior Publication Data
US 2016/0234895 A1 Aug. 11, 2016

(30) Foreign Application Priority Data
Sep. 19, 2013 (EP) .................................... 13185185

(51) Int. Cl.
*H05B 33/08* (2006.01)
(52) U.S. Cl.
CPC ....... *H05B 33/0815* (2013.01); *H05B 33/083* (2013.01); *H05B 33/0812* (2013.01)

(58) Field of Classification Search
CPC .... H05B 37/02; H05B 33/08; H05B 33/0812; H05B 33/0815; H05B 33/0833; H05B 33/0842; H05B 33/0857
(Continued)

(56) References Cited

U.S. PATENT DOCUMENTS 6,522,558 B2  2/2003 Henry
6,812,776 B2  11/2004 Henry
(Continued)

FOREIGN PATENT DOCUMENTS

JP    2007080771 A    3/2007
JP    2011504075 A    1/2011
(Continued)

OTHER PUBLICATIONS

Kumar, et al., "Novel Switched Capacitor Based Triple Output Fixed Ratio Converter (TOFRC)", IEEE, 2002, pp. 2352-2356.

*Primary Examiner* — Jimmy Vu
(74) *Attorney, Agent, or Firm* — Akarsh P. Belagodu

(57) ABSTRACT

The current invention relates to a LED driver (10) for driving at least two LED strings (131, 133) comprising: a dual output power converter (103) for converting an input voltage (Vin) into two different output voltages for driving two sets of said at least two LED strings (131, 133), a controller (107) for controlling the dual output power converter (103) based on at least one input set point, the dual output converter (103) comprising a switched capacitor converter comprising a plurality of switches, a plurality of capacitors, the outputs of the dual output power converter (103) being connected to internal nodes of the dual power converter (103), the controller (107) being further adapted to deliver PWM output control signals for driving the switches, the duty cycle of which being a function of said at least one
(Continued)

input set point. The invention also relates to a lighting system (1) comprising such a driver (10).

14 Claims, 6 Drawing Sheets

(58) Field of Classification Search
USPC ... 315/209 R, 210, 224, 225, 291, 307, 308, 315/312
See application file for complete search history.

(56) References Cited

U.S. PATENT DOCUMENTS

| | | |
|---|---|---|
| 7,368,977 B2 | 5/2008 | Wei et al. |
| 7,696,735 B2 | 4/2010 | Oraw et al. |
| 2002/0067143 A1 | 6/2002 | Robinett |
| 2006/0238465 A1 | 10/2006 | Kurumisawa |
| 2006/0262574 A1 | 11/2006 | Kelly |
| 2008/0239772 A1 | 10/2008 | Oraw et al. |
| 2010/0033109 A1 | 2/2010 | Liu et al. |
| 2012/0032613 A1* | 2/2012 | Liu .................. G09G 3/3406 315/297 |
| 2012/0206946 A1 | 8/2012 | Sagneri et al. |
| 2013/0154482 A1 | 6/2013 | Ge et al. |

FOREIGN PATENT DOCUMENTS

| | | |
|---|---|---|
| WO | 2006043370 A1 | 4/2006 |
| WO | WO2013086445 | 6/2013 |

* cited by examiner

COMPACT DRIVER FOR A LIGHT EMITTING DIODE HAVING AN INTEGRATED DUAL OUTPUT

CROSS-REFERENCE TO PRIOR APPLICATIONS

This application is the U.S. National Phase application under 35 U.S.C. §371 of International Application No. PCT/IB2014/064651, filed on Sep. 19, 2014, which claims the benefit of European Patent Application No. 13185185.9, filed on Sep. 19, 2013. These applications are hereby incorporated by reference herein.

TECHNICAL FIELD

The current invention relates to the field of integrated power converters. The current invention can notably apply to drive circuits for light emitting devices such as Light Emitting Diodes (LED) light sources. More specifically, the current invention relates to a compact and efficient power conversion device.

BACKGROUND

Applications requiring a high level of integration of power conversion modules, for example using Switched Mode Power Supplies (SMPS), can resort to power converters such as Switched Capacitor Converters (SCC), which can provide highly efficient DC-to-DC voltage conversion with only the use of capacitors and switches, combined with inductive output filters.

Notably, the Solid State Lighting (SSL) Industry's demand for small and compact power management units for LEDs is increasing. LEDs require that a power supply be delivered in the form of a constant current, as efficiently as possible. Ideally, LED drivers comparable in size to the LEDs themselves would represent a significant breakthrough enabling new lighting concepts. Such a solution will require a system with a high level of reliability and efficiency, in order to fit the requirements of life-time, size and heat dissipation.

LED drivers can be based on Switched Mode Power Supplies (SMPS). Notably, some LED drivers can comprise hybrid power converters combining SCCs with inductive SMPS. One of the challenges when designing LED drivers is that of allowing their ability to effectively implement color control features, such as black body line dimming and color point stability. Such features require that LED drivers comprise plural outputs, and associated control means that usually are complex and not easily able to be integrated in compact architectures. For example, black body line dimming can be ensured by driving two LEDs, for example one LED emitting a white light and one LED emitting light with a determined wavelength, for example one LED emitting cool white light, and one LED emitting red light; hence in such an exemplary configuration, two drivers are required, or a driver with two distinct outputs.

The existing state-of-the art still lacks LED drivers that would integrate in a compact, efficient and optimized manner all the complex requirements in terms of color tuning and multi-output power management.

SUMMARY

One aim of the present invention is to remedy to the above-mentioned shortcomings of the prior art, by proposing a solution allowing multi-output power management through one single power conversion module.

According to the present invention, it is proposed a driver arrangement based on a hybrid architecture exploiting the intrinsic characteristics of a SCC.

For that purpose, the current invention proposes a novel driver for driving at least two sets of Light Emitting Devices (LED) or LED strings comprising:
 a dual output power converter adapted to convert an input voltage into two different output voltages for driving said two sets of LED strings,
 a controller adapted to control the dual output power converter based on at least one input set point,
 wherein the dual output converter comprises a switched capacitor converter comprising a plurality of switches and a plurality of capacitors, the outputs of the dual output power converter being connected to internal nodes of the dual output power converter, the controller being further adapted to deliver Pulse Width Modulation (PWM) output control signals for driving the switches, the duty cycle of which being a function of said at least one input set point.

In an exemplary embodiment of the invention, the driver can further comprise a controllable voltage regulator adapted to control the input voltage supplied to the dual output power converter.

In an exemplary embodiment of the invention, the controller can further be adapted to control the controllable voltage regulator.

In an exemplary embodiment of the invention, the controller can be further adapted to control the dual output power converter in a closed-loop manner as a function of a feedback signal representative of the operation of at least one of said at least two sets of LED strings.

In an exemplary embodiment of the invention, the controller can further be adapted to control the controllable voltage regulator in a closed-loop manner as a function of a feedback signal representative of the operation of at least one of said at least two sets of LED strings.

In an exemplary embodiment of the invention, the driver can further comprise an output filter, at least one of said two sets of LED strings being driven by at least one of the two different output voltages through the output filter.

In an exemplary embodiment of the invention, the switched capacitor converter comprised by the dual output power converter can be based on a Ladder structure.

In an exemplary embodiment of the invention, the switched capacitor converter comprised by the dual output power converter can be based on a Dickson Ladder structure.

In an exemplary embodiment of the invention, the switched capacitor converter comprised by the dual output power converter can be based on a Fibonacci structure.

In an exemplary embodiment of the invention, the controllable voltage regulator can comprise a Switched Mode Power Supply (SMPS).

In an exemplary embodiment of the invention, the controllable voltage regulator can comprise a linear voltage regulator.

Another aspect of the current invention is a lighting system comprising two set of LED strings, wherein said two sets of LED strings are driven by a driver as claimed in any of the described embodiments.

In an exemplary embodiment of the invention, said two sets of LED strings can respectively comprise one or a plurality of red light LEDs in series and one or a plurality of blue light LEDs in series.

Another aspect of the current invention is a method for driving at least two sets of LED strings comprising at least a step of converting an input voltage into two different output voltages for driving said two sets LED strings, controlling a dual output power converter comprising a switched capacitor converter with a plurality of switches and a plurality of capacitors through driving the switches with PWM signals, the duty cycle of which being a function of said at least one input set point.

Another advantage of the current invention, in the second exemplary embodiment as described below, beside a reduced size and count of components, is that the invention notably facilitates black body line dimming with the use of a single control variable.

BRIEF DESCRIPTION OF THE DRAWINGS

These and other characteristics and advantages of the invention will be made clearer in view of the detailed description given below of a preferred embodiment, provided by way of an illustrative and non-limiting example only, as well as the accompanying drawings which represent.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

Figure 1:
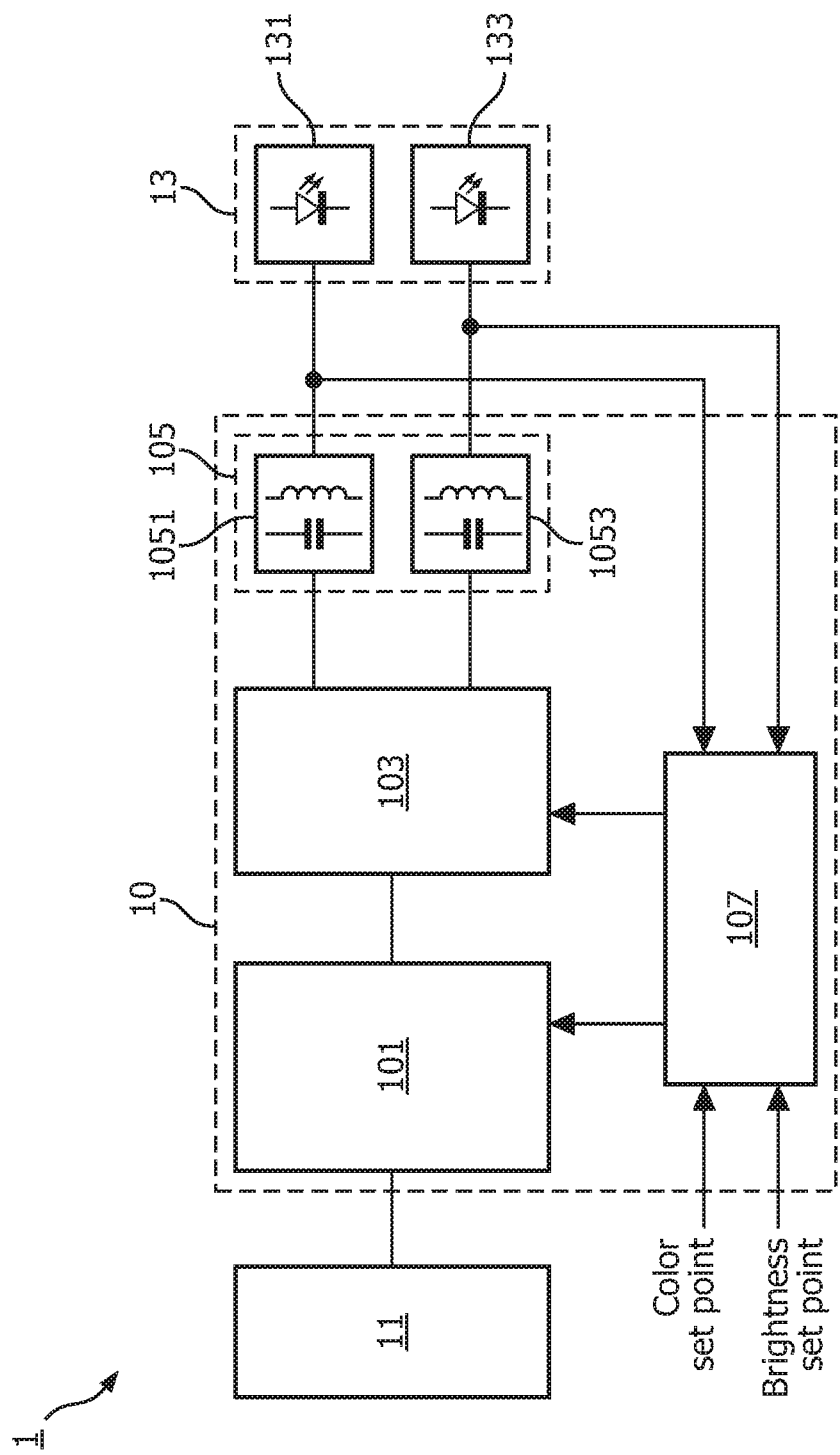
FIG. 1, a block diagram illustrating a LED driver connected to a load and a voltage supply, in an exemplary embodiment of the invention.

FIG. 1 shows a block diagram illustrating a LED driver connected to a load and a voltage supply, in an exemplary embodiment of the invention.

FIG. 1 depicts a LED driver 10 connected to a power supply 11, and attached to a load 13. The driver and the load are elements of a lighting system 1, which also is an aspect of the current invention.

The power supply 11 can for example be designed to supply a AC or DC voltage Vsupply. For example, the supply voltage Vsupply can be an AC voltage from mains, or a DC voltage supplied by a DC grid or a battery.

The load 13 can for example comprise one first LED string 131 and one second LED string 133. In the present disclosure, it is considered that a LED string can comprise one or a plurality of LEDs. The two LED strings 131, 133 are adapted to emit different types of light. For example, the first LED string 131 may be adapted to emit Red light, and the second LED string 133 may be adapted to emit Blue light, in such a way that mixing the light beams produced by the two LED strings 131, 133 notably allows black bodyline dimming.

The LED driver 10 comprises a controllable voltage regulator 101, adapted to accept the supply voltage Vsupply and to deliver a regulated voltage, a dual output power converter 103 and may comprise an output filter 105. In the exemplary embodiment of the invention illustrated by FIG. 1, the output filter 105 comprises one first output filter 1051 and one second output filter 1053, in such a way that each output of the dual output power converter 103 is associated with a respective output filter. The first output filter 1051 is connected to the first LED string 131, and the second output filter 1053 is connected to the first LED string 133.

The LED driver 10 further comprises a controller 107. The controller 107 comprises at least one input for receiving at least one set point control signal, and comprises at least one output for delivering at least one control signal, to at least the dual output power converter 103.

The controller 107 can further comprise at least two feedback inputs for receiving feedback signals representative of the actual operation of the load 13, for example one first feedback input for receiving a signal that is representative of a sensed current through the first LED string 131, and one second feedback input for receiving a signal that is representative of a sensed current through the second LED string 133. The controller 103 can thus adjust operating parameters of the dual output converter 103 and/or the controllable voltage regulator 101, as a function of input set point values, and feedback signals representative of the load 13 operation, as explained further in detail below.

According to a specificity of the current invention, it is proposed that the dual output power converter 103 is formed by a controllable switched capacitor converter, comprising a plurality of switches and a plurality of capacitors, and that the outputs of the dual output power converter 103 are directly connected to internal nodes of the switched capacitor converter. A controllable SCC typically comprises a plurality of internal nodes, some of which being used as outputs in the current invention. Notably, a controllable SCC typically comprises at least one DC node, providing a voltage that has a fixed value that is independent of the duty cycle, some other internal nodes being floating PWM nodes, providing a pulsating voltage that can be modulated by varying the duty cycle. The two outputs of the dual output power converter 103 can thus be controlled separately, by means of a single controller 107, through a switched capacitor converter, which offers the advantage of requiring a simple and compact architecture. The small voltage ripple at the floating PWM nodes notably provides the advantage of alleviating the requirements on the output filters; if an inductive output filter is used, then the size of the inductor can hence be dramatically reduced. In the exemplary embodiments described in FIG. 2 described in detail below, a 100-nH inductor can be used an output filter inductance.

Figure 2:
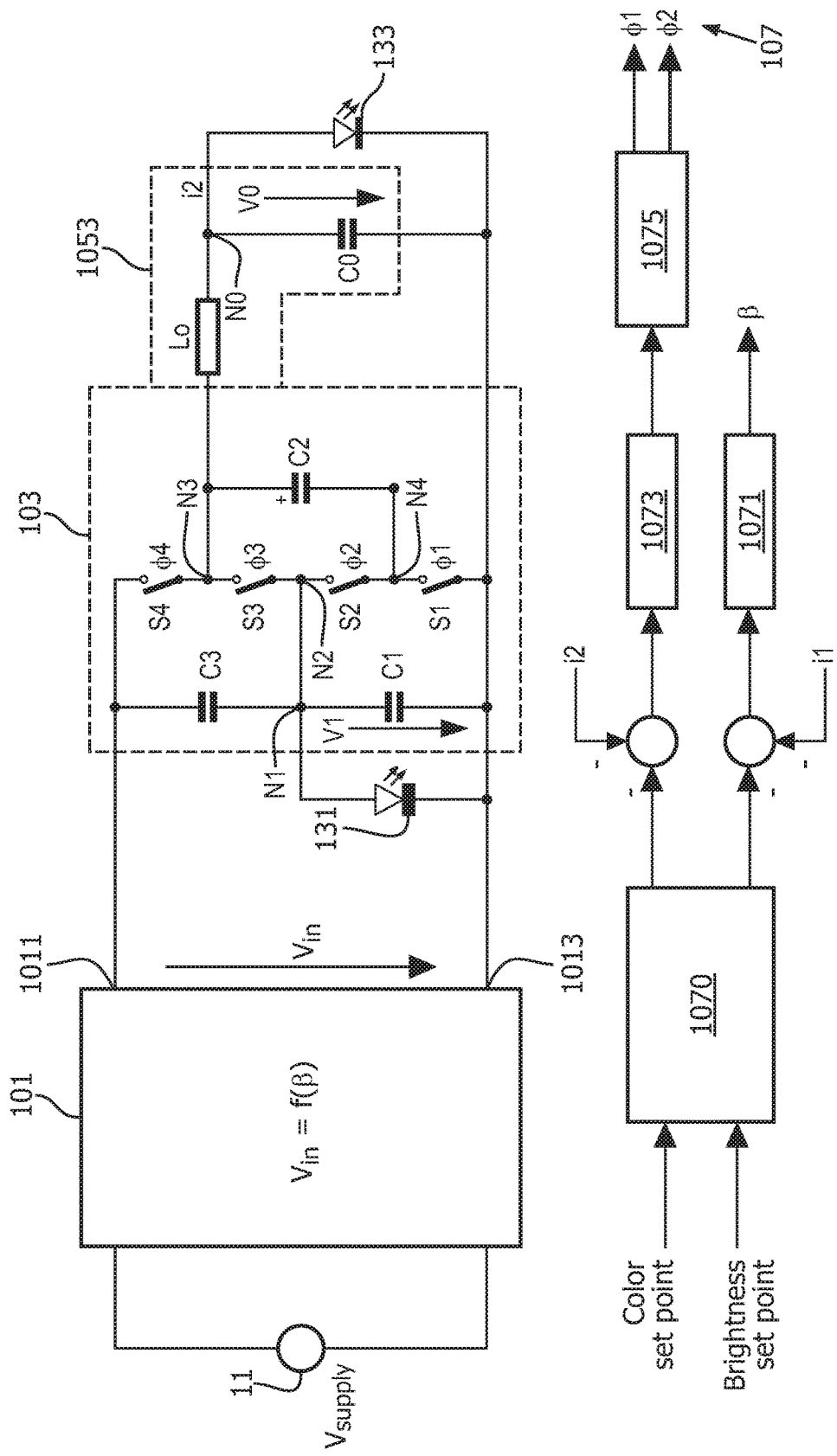
FIG. 2, an electrical diagram illustrating a dual output converter comprised by a LED driver, in a first exemplary embodiment of the invention.

FIG. 2 shows an electrical diagram illustrating a dual output converter comprised by a LED driver, in an exemplary embodiment of the invention.

In the first exemplary embodiment of the invention illustrated by FIG. 2, it is allowed that the two outputs of the dual output power converter 103 are controlled in a fully independent manner.

Referring to FIG. 2, a lighting system 1 may comprise a controllable voltage regulator 101, connected to a power supply 11 supplying a voltage Vsupply through two terminals. The controllable voltage regulator 101 is configured for supplying an input voltage Vin to the dual output power converter 103 through two output terminals 1011, 1013.

In the exemplary embodiment illustrated by FIG. 2, the dual output power converter 103 comprises a switched capacitor converter comprising three capacitors C1, C2, C3 and four switches S1, ..., S4, which can be of the single pole, single throw type.

The controllable voltage regulator 101 may be formed by a controllable SMPS and allows controlling the input voltage Vin supplied to the dual output power converter 103. Any other topology of a controllable voltage regulator can also be resorted to, which enables output voltage regulation through DC to DC or AC to DC conversion. For example, a linear voltage regulator can be used.

The SCC as illustrated in FIG. 2 forms a so-called Ladder structure. In the exemplary embodiment illustrated by FIG. 2, the first and third capacitors C1, C3 are put in series in a first circuit branch between the first output terminal 1011 of the controllable voltage regulator 101 and the second output terminal 1013 of the controllable voltage regulator 101, the second output terminal 1013 being for instance connected to a reference potential, such as the ground potential.

The four switches S1, ..., S4 of the Ladder structure may be put in series in a second circuit branch that is parallel to the first circuit branch. A first internal node N1 of the Ladder structure is a common node between the first capacitor C1 and the third capacitor C3 and can be connected to a second internal node N2 that is a common node between the second and third switches S2, S3. A second output of the dual output power converter 103 can be connected to a third internal node N3 that is a common node between the third and fourth switches S3, S4. The second capacitor C2 is connected between the third internal node N3 and a fourth internal node N4 that is a common node between the first and second switches S1, S2. The first capacitor C1 is connected between the first internal node N1 and the second output terminal 1013 of the controllable voltage regulator 101, while the third capacitor C3 is connected between the first internal node N1 and the first output terminal 1011 of the controllable voltage regulator 101.

The first LED string 131 can be connected in parallel with the first capacitor C1, between the first internal node N1 and the second output terminal 1013 of the controllable voltage regulator 101. The voltage across the first LED string 131 is denoted as v1.

An output filter inductance Lo can be connected between the third internal node N3 and an output node No that is a common node between the output filter inductance Lo and an output filter capacitor Co, connected between the output node No and the second output terminal 1013 of the controllable voltage regulator 101. The second LED string 133 can be connected in parallel with the output filter capacitor Co. The voltage across the second LED string 133 is denoted as vo. The output filter capacitor Co and the output filter inductance Lo thus form the second output filter 1053 as described above in reference to FIG. 1.

In the exemplary embodiment illustrated by FIG. 2, the first LED string 131 is not associated with an inductive output filter, as it is connected to a DC node of the SCC comprised by the dual output power converter 103; hence, in this exemplary embodiment the first capacitor C1 forms the first output filter 1051 as described above in reference to FIG. 1.

Still in the exemplary embodiment illustrated by FIG. 2, the controller 107 comprises a set point controller 1070 adapted to receive set point signals; for example, the set point controller 1070 is adapted to receive a color set point signal and a brightness set point signal, and to deliver respective control signals for controlling the first and second LEDs 131, 133. Brightness control can be achieved by controlling the total amount of light that is emitted, while color point control can be achieved by controlling the relative amount of power that each LED string 131, 133 is emitting.

The controller 107 further comprises a first LED controller 1071 delivering a first control signal β intended to the first LED string 131, based upon the first control signal output by the set point controller 1070 and on a first feedback signal representative of the current i1 through the first LED string 131. Similarly the controller 107 comprises a second LED controller 1073 delivering a second control signal intended to the second LED string 133 based upon the second control signal output by the set point controller 1070 and on a second feedback signal representative of the current i2 through the second LED string 133.

The controller 107 further comprises a pulse width modulator 1075. The second control signal delivered by the second LED controller 1073 is sent to the pulse width modulator 1075 which drives a first PWM control signal $\Phi 1$ and a second control signal $\Phi 2$, the phases of the first and second control signals $\Phi 1$, $\Phi 2$ being complementary.

In practice, the controller 107 can for example be implemented in a dedicated Integrated Circuit, or through appropriate configuration of a microcontroller.

In the exemplary embodiment illustrated by FIG. 2, the two outputs of the dual output power converter 103 are therefore respectively formed by the nodes of the Ladder structure that respectively bring the voltage v1 across the first LED string 131 and voltage vo across the second LED string 133.

Hence the first output, corresponding to the voltage v1, is a fix output providing an ideal conversion ratio fixed by the SCC topology, which is equal to 1/2 in the illustrated exemplary embodiment, and which is not dependent on the duty cycle of the two control signals $\Phi 1$, $\Phi 2$, in this exemplary embodiment wherein the dual output power converter 103 comprises a 2:1 Ladder structure.

The second output, corresponding to the voltage vo, is the low-pass filtered component of the signal that is brought by the third node N3. The third node N3 brings a square-wave voltage, the mean value of which can be adjusted through adjusting the duty cycle of the control signals $\Phi 1$, $\Phi 2$, to provide a conversion ratio comprised between 1/2 and 1. For instance, when the dual output power converter 103 operates with a duty cycle of 50% supplied at a voltage of 4 Volts, the voltage v1 across the first LED string 131 is 2 Volts, and the voltage vo across the second LED string 133 is 3 Volts.

In order to adjust the currents of the two LED strings 131, 133, i.e. the voltages at its two outputs, the dual output power converter 103 deals with two variables that can be adjusted by means of the controller 107: the input voltage of the dual output power converter 103, i.e. the input voltage Vin delivered by the controllable voltage regulator 101, and the duty cycle of the two control signals $\Phi 1$, $\Phi 2$.

The switches S1, ..., S4 of the Ladder structure are controlled by the two control signals $\Phi 1$, $\Phi 2$, the first and third switches S1, S3 being controlled by the first control signal Φ1, while the second and fourth switches S2, S4 are controlled by the second control signal Φ2.

Variations in the input voltage Vin affect the two outputs of the dual output power converter 103; whereas variations of the duty cycle only affect the second output of the dual output power converter 103, i.e. the voltage vo. The controller can therefore be adapted to adequately adapt the duty cycle when the input voltage Vin is varied, so that still an appropriate current can be delivered to the second LED string 133. The two LED controllers 1071, 1073 provide independent current regulation to the two outputs of the dual output power converter 103. The current through the first LED string 131 is controlled by adjusting the input voltage Vin, through the first control signal β delivered by the controller 107; the current through the second LED string 133 is controlled by varying the duty cycle of the two control signals Φ1, Φ2. The set point controller 1070 allows adjusting the current set points of the outputs of the dual output power converter 103 according to the input set points, for instance color set point and brightness set point.

Figure 3A:
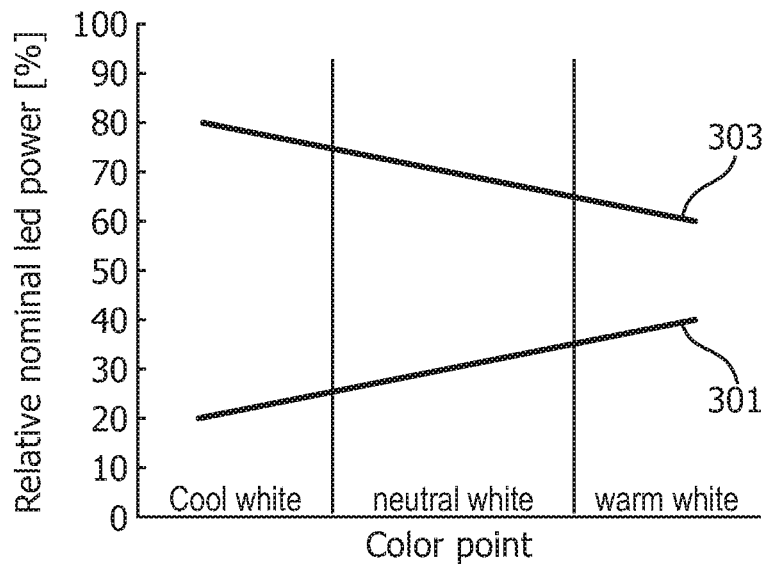
FIGS. 3A, 3B and 3C, diagrams illustrating the values of different adjustment parameters as set by a set point controller in a driver following an exemplary embodiment of the invention, for the purpose of achieving given target values of a color point.
Figure 3B:
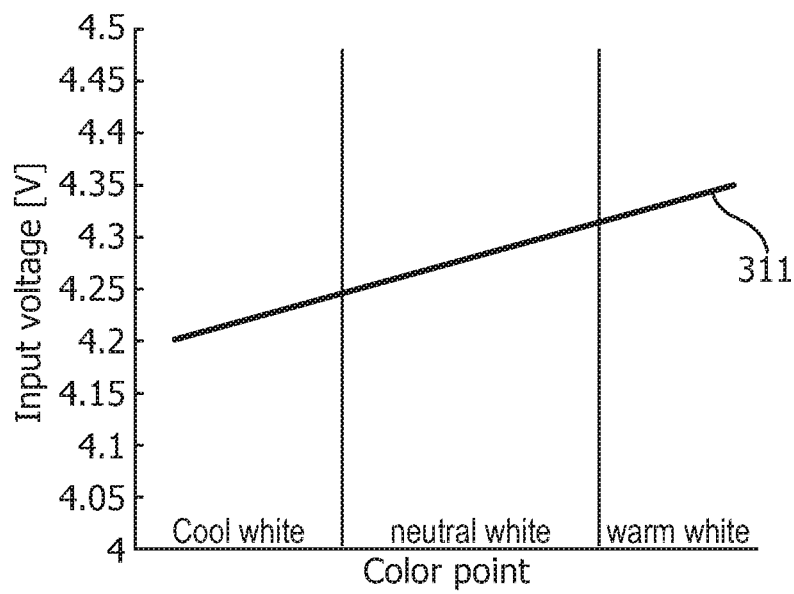
Figure 3C:
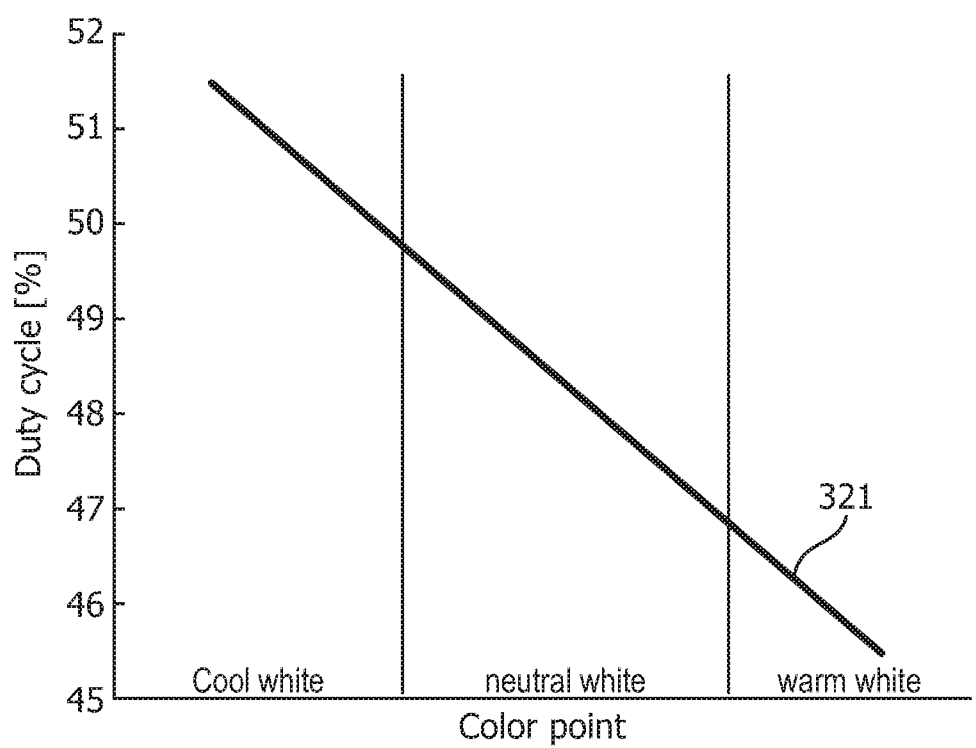

FIG. 3A to 3C show diagrams illustrating the values of different adjustment parameters as set by a set point controller 1070 in a driver following an exemplary embodiment of the invention, for the purpose of achieving given target values of a color point.

FIGS. 3A to 3C relate to an exemplary embodiment comprising a driver as described above in reference to FIG. 2, for a total output power of 1 Watt, with a 2-V red LED and a 3-V blue LED supplied with a 4-V input within a standard color point adjustment between cold and warm white.

In the graph depicted in FIG. 3A, the abscissae correspond to a color set point value, ranging from cold white to warm white, in an exemplary embodiment as illustrated in FIG. 2, wherein the first LED string 131 is a Red LED, and the second LED string 133 is a Blue LED. The ordinates correspond to a percentage of power fed to a LED string, the total of the relative power fed to the first LED string 131 and the relative power fed to the second LED string 133 is equal to 100%, whatever the color set point value. A first linear curve 301 corresponds to the characteristics of the first LED string 131 and a second linear curve 303 corresponds to the characteristics of the second LED string 133.

For example, cold white can be obtained through setting the relative power fed to the first LED string 131 at 20% and the relative power fed to the second LED string 133 at 80%; warm white can be obtained through setting the relative power fed to the first LED string 131 at 40% and the relative power fed to the second LED string 133 at 60%. All intermediate increasing values of the color point can be achieved through linearly increasing the relative power fed to the first LED string 131 while linearly decreasing the relative power fed to the second LED string 133.

In the graph depicted by FIG. 3B, the abscissae correspond to a color set point value, ranging from cold white to warm white, in a way similar as the graph depicted by FIG. 3A described above. The ordinates correspond to the input voltage Vin level, in Volts. A linear curve 311 shows the variations of the input voltage Vin according to the color set point value. Through linearly increasing the input voltage Vin level within a range of 0.5 V, it is possible to obtain the increasing color set point values.

In the graph depicted by FIG. 3C, the abscissae correspond to a color set point value, ranging from cold white to warm white, in a way similar as the graph depicted by FIGS. 3A and 3B described above. The ordinated correspond to the duty cycle of the control signals Φ1, Φ2. A linear curve 321 shows the variations of the duty cycle according to the color set point value. Through linearly decreasing the duty cycle within a range of 10%, it is possible to obtain the increasing color set point values.

Figure 4:
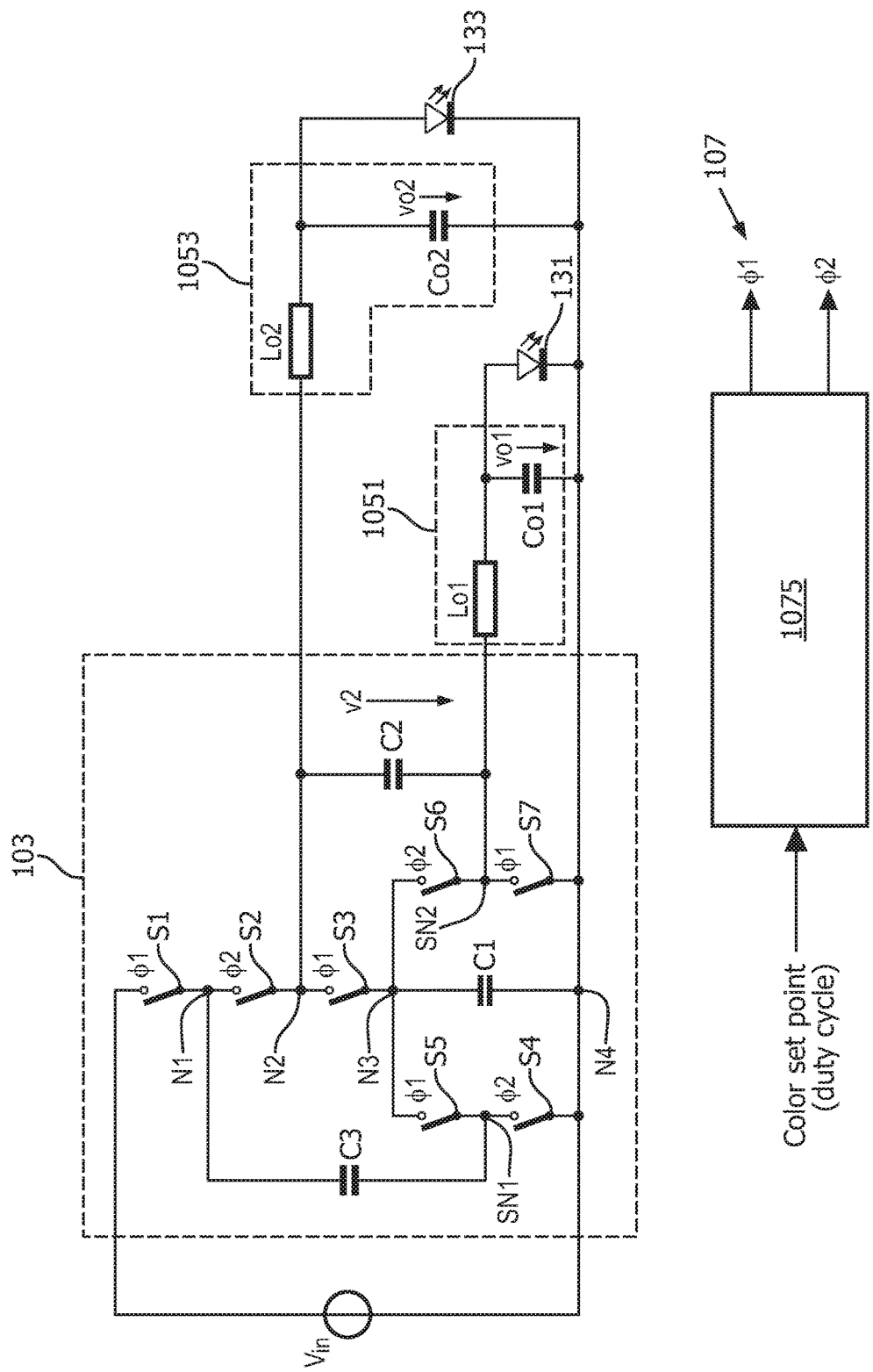
FIG. 4, an electrical diagram illustrating a dual output converter comprised by a LED driver, in a second embodiment of the invention.

FIG. 4 shows an electrical diagram illustrating a dual output converter comprised by a LED driver, in a second embodiment of the invention.

The second embodiment lies on an alternative topology according to the current invention, which allows providing two adjustable DC outputs having a complementary behavior. In the second embodiment, the dual output power converter 103 is supplied with an input voltage Vin, and is formed by a switched capacitor converter, one internal node of which being connected to the first LED string 131, for example a Red LED, and one other internal node of which being connected to the second LED string 133, for example a Blue LED, as described in further detail hereinafter. In the second embodiment, the first LED string 131 is associated with a first output filter 1051 comprising a first output filter inductance Lo1 and a first output filter capacitor Co1, and the second LED string 133 is associated with a second output filter 1053 comprising a second output filter inductance Lo2 and a second output filter capacitor Co2.

In the exemplary embodiment illustrated by FIG. 4, the dual output power converter 103 comprises a so-called 3:1 Dickson Ladder structure comprising three capacitors C1, C2, C3 and seven switches S1, . . . , S7, which can be of the single pole, single throw type.

More specifically, the dual output power converter 103 as in the illustrated embodiment comprises two flying ladders, each flying ladder comprising one capacitor: one first flying ladder comprises a third capacitor C3 and one second flying ladder comprises a second capacitor C2.

The dual output power converter 103 further comprises three central nodes N1, N2, N3. One first switch S1 selectively connects the first central node N1 to the input voltage Vin. A second switch S2 selectively connects the second central node N2 to the first central node N1. A third switch selectively connects the second central node N2 to the third central node N3. A first capacitor C1 is placed between the third central node N3 and one fourth central node N4. The fourth central node N4 is connected to a reference potential, for example to the ground potential.

The first flying ladder comprising the third capacitor C3 is located between the first central node N1 and one first secondary node SN1. One fourth switch S4 selectively connects the first secondary node SN1 to the fourth central node N4; one fifth switch S5 selectively connects the first secondary node SN1 to the third central node N3.

The second flying ladder comprising the second capacitor C2 is located between the second central node N2 and one second secondary node SN2. One sixth switch S6 selectively connects the second secondary node SN2 to the third central node N3; one seventh switch S7 selectively connects the second secondary node SN2 to the fourth central node N4.

The two flying ladders are oppositely phased, thanks to an adequate sequence of opening and closing the switches S1 to S7. For example, all the odd-numbered switches S1, S3, S5 can be in a given state during a first time phase Φ1, for instance turned on, while all the even-numbered switches S2, S4, S6 are in the opposite state, for instance turned off; during a successive second time phase Φ2, the states of all the switches can be reversed.

Still in the second embodiment illustrated by FIG. 4, the controller 107 has a simpler structure in comparison with the controller 107 as per the first embodiment described above in reference to FIG. 2. The controller 107 can comprise a pulse width modulator 1075 configured for driving a first PWM control signal Φ1 and a second control signal Φ2, the phases of the first and second control signals Φ1, Φ2 being complementary, based upon a single color set point signal, which actually corresponds to a duty cycle value set point, as described further in details below.

In the second exemplary embodiment illustrated by FIG. 4, the first LED string 131 is connected in parallel with the first output filter capacitor Co1, the first output filter inductance Lo1 being connected to the second secondary node SN2. The voltage across the first LED string 131 is designated as vo1. The second LED string 133 is connected in parallel to the second output filter capacitor Co2, the second output filter inductance Lo2 being connected to the second central node N2. The voltage across the second LED string 133 is designated as vo2.

Thus, the voltage vo1 across the first LED string 131 is the DC component of the voltage present at the second secondary node SN2 of the Dickson-Ladder structure comprised by the dual output power converter 103, and its mean value can be adjusted to enable a conversion ratio between 0 and 1/3. The voltage vo2 across the second LED string 133 is the DC component of the voltage present at the second central node N2 and its mean value can be adjusted to enable a conversion ratio between 2/3 and 1.

For example, operating the dual output power converter 103 with a duty cycle of 75% supplied at a voltage of 8 Volts allows generating an output of 2 V for the first LED string 131, and 6 V for two LEDs put in series in place of the second LED string 133. When the duty cycle increases the voltage vo1 across the first LED string 131 increases, driving more current through the first LED string 131, while the voltage vo2 across the two LEDs in series decreases, driving less current through the two LEDs. An opposite behavior can be achieved when the duty cycle decreases.

Figure 5A:
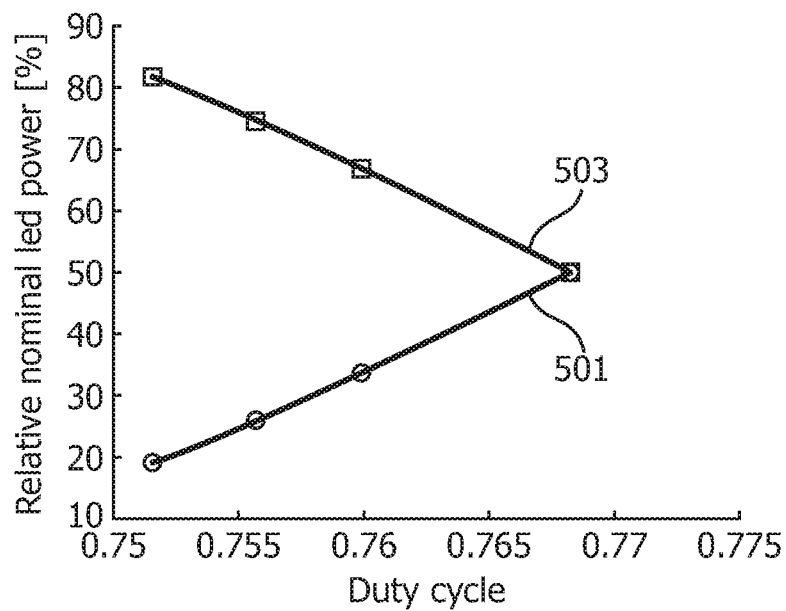
FIGS. 5A and 5B, diagrams illustrating output characteristics of a dual output converter comprised by a LED driver according to the second exemplary embodiment of the invention illustrated by FIG. 4.
Figure 5B:
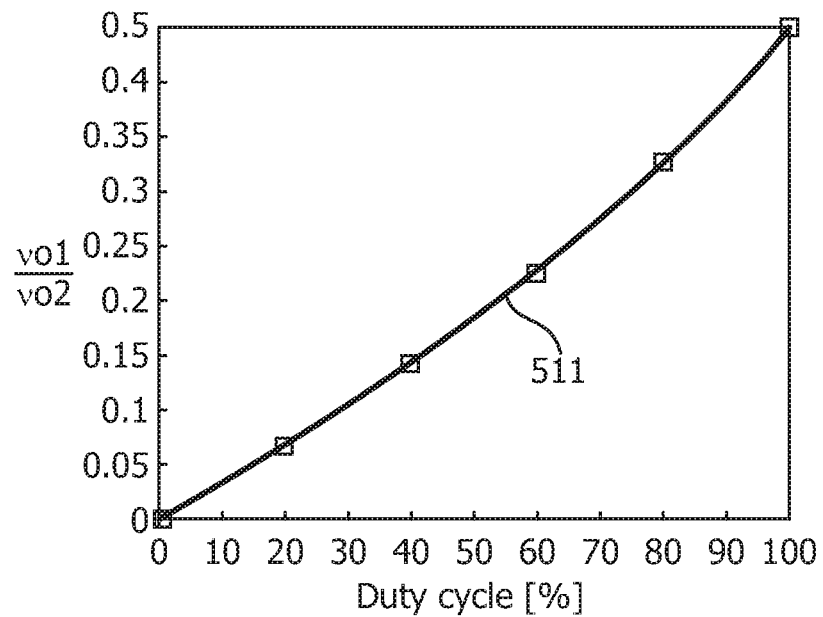

FIGS. 5A and 5B show diagrams illustrating output characteristics of a dual output converter comprised by a LED driver according to the second exemplary embodiment of the invention illustrated by FIG. 4. FIGS. 5A and 5B depict the distribution of the input power in each of the LED strings.

In the graph depicted in FIG. 5A, the abscissae correspond to a color set point value, ranging from cold white to warm white, in an exemplary embodiment as illustrated in FIG. 4, wherein the first LED string 131 is a Red LED, and the second LED string 133 is a Blue LED. The ordinates correspond to a percentage of power fed to a LED string, the total of the relative power fed to the first LED string 131 and the relative power fed to the second LED string 133 is equal to 100%, whatever the color set point value. A first linear curve 501 corresponds to the characteristics of the first LED string 131 and a second linear curve 303 corresponds to the characteristics of the second LED string 133.

For example, cold white can be obtained through setting the relative power fed to the first LED string 131 at 20% and the relative power fed to the second LED string 133 at 80%; warm white can be obtained through setting the relative power fed to the first LED string 131 at 50% and the relative power fed to the second LED string 133 at 50%. All intermediate increasing values of the color point can be achieved through linearly increasing the relative power fed to the first LED string 131 while linearly decreasing the relative power fed to the second LED string 133.

In the graph depicted by FIG. 5B, the abscissae correspond to a color set point value, namely a duty cycle percentage ranging from 0 to 100%, corresponding to a color set point value ranging from cold white to warm white, in a way similar as the graph depicted by FIG. 5A described above. The ordinates correspond to the ratio between the voltage vo1 across the first LED string 131 and the voltage vo2 across the second LED string 133. A curve 511 shows the variations of said ratio according to the color set point value, i.e. as a function of the duty cycle. Through increasing the duty cycle, it is possible to vary said ratio between 0 and 0.5, with a dual output power converter 103 as in the illustrated embodiment illustrated by FIG. 4.

Summarizing, the current invention allows separately controlling two outputs of a power converter, by at least controlling the duty signal of control signals that drive the switches of a power converter, the power converter being formed by a switched capacitor converter, and the outputs of the power converter being connected to internal nodes of the switched capacitor structure, which are already intrinsically comprised by this structure.

In advantageous embodiments such as the first embodiment described above, it is possible to control the two outputs of the power converter in a completely independent manner, based upon a color set point and possibly a brightness set point, through varying the duty cycle of the control signals, as well as the input voltage Vin of the power converter.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

For example, the output filters as per the described embodiments are inductive filters, but other known types of output filters can also be used.

As another example, the exemplary switched capacitor converters in the two main embodiments described above are in no way limiting the current inventions, as any other types of switched capacitor converters may be used, for instance Fibonacci SCCs, or SCCs with more complex structures involving more capacitors and switches, without departing from the inventive concept of the current invention.

Yet as another example, notably referring to the second main embodiment described above, the presence of a controllable voltage regulator is optional, if a driver or a lighting system comprising a dual output power converter is to be connected to a source already providing a regulated supply voltage.

Yet as another example, a close-loop control of the current through the load is also optional, and open-loop schemes can also be considered without departing from the inventive concept of the current invention.

All the switches used in SCC architecture described herein can be bi-directional and implemented in a suitable technology that is compatible with the switching frequency of the circuit. For instance the switches can be formed by Metal Oxide Semiconductor Field Effect Transistors (MOSFET) on a silicon substrate or High Electron Mobility Transistors (HEMT) on a Gallium-Nitride substrate.

All the reactive elements can be sized small enough to enable integration, for example as a Power System on a Chip (PSoC) or Power System in a Package (PSiP).

The capacitors can also be implemented using a technology similar to that applied to Ferroelectric Random Access Memory (FRAM) or embedded Dynamic Random Access Memory (eDRAM). The higher dielectric constant achieved with such technologies makes the integrated SCCs smaller and thus cheaper.

All definitions, as defined and used herein, should be understood to control over dictionary definitions, definitions in documents incorporated by reference, and/or ordinary meanings of the defined terms.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed at limiting the scope.

The invention claimed is:

1. A Driver for driving at least two sets of Light Emitting Device (LED) strings comprising:
   a dual output power converter adapted to convert an input voltage into two different output voltages for driving said two sets of LED strings,
   a controller adapted to control the dual output power converter based on at least one input set point,
   wherein the dual output converter comprises a switched capacitor converter comprising a plurality of switches and a plurality of capacitors, the outputs of the dual output power converter being connected to internal nodes of the dual output power converter, the controller being further adapted to deliver Pulse Width Modulation output control signals for driving the switches, the duty cycle of which being a function of said at least one input set point.

2. The Driver as claimed in claim 1, further comprising a controllable voltage regulator adapted to control the input voltage supplied to the dual output power converter.

3. The Driver as claimed in claim 2, wherein the controller is further adapted to control the controllable voltage regulator.

4. The Driver as claimed in claim 1, wherein the controller is further adapted to control the dual output power converter in a closed-loop manner as a function of a feedback signal representative of the operation of at least one of said at least two sets of LED strings.

5. The Driver as claimed in claim 3, wherein the controller is further adapted to control the controllable voltage regulator in a closed-loop manner as a function of a feedback signal representative of the operation of at least one of said at least two sets of LED strings.

6. The Driver as claimed in claim 1, further comprising an output filter, at least one of said two sets of LED strings being driven by at least one of the two different output voltages through the output filter.

7. The Driver as claimed in claim 1, wherein the switched capacitor converter comprised by the dual output power converter is based on a Ladder structure.

8. The Driver as claimed in claim 1, wherein the switched capacitor converter comprised by the dual output power converter is based on a Dickson Ladder structure.

9. The Driver as claimed in claim 1, wherein the switched capacitor converter comprised by the dual output power converter is based on a Fibonacci structure.

10. The Driver as claimed in claim 2, wherein the controllable voltage regulator comprises a Switched Mode Power Supply.

11. The Driver as claimed in claim 2, wherein the controllable voltage regulator comprises a linear voltage regulator.

12. A Lighting system comprising two set of LED strings, wherein said two sets of LED strings are driven by a driver as claimed in claim 1.

13. The Lighting system as claimed in claim 12, wherein said two sets of LED strings respectively comprise one or a plurality of red light LEDs in series and one or a plurality of blue light LEDs in series.

14. A Method for driving at least two sets of Light Emitting Device strings comprising at least a step of converting an input voltage into two different output voltages for driving said two sets LED strings, controlling a dual output power converter comprising a switched capacitor converter with a plurality of switches and a plurality of capacitors through driving the switches with Pulse Width Modulation signals, the duty cycle of which being a function of said at least one input set point.

* * * * *